Patented May 29, 1951

2,554,959

UNITED STATES PATENT OFFICE 2,554,959

POLYMERIC IMIDO-ESTERS PREPARED FROM MALEIC ANHYDRIDE HETEROPOLYMERS AND 2(11 - HYDROXY-8-HEPTADECENYL) OXAZOLINES

Stanley P. Rowland, Philadelphia, Pa., assignor to Rohm & Haas Company, Philadelphia, Pa., a corporation of Delaware No Drawing. Application October 26, 1950, Serial No. 192,358

14 Claims. (Cl. 260—78.5)

This invention relates to a new class of resinous materials and to a process of preparing them.

The products of this invention are polymeric, resinous imido-esters and they are made by chemically reacting a heteropolymer of maleic anhydride and a polymerizable vinylidene compound containing a single vinylidene group, $>C=CH_2$, with a particular kind of oxazoline; namely, one having the general formula

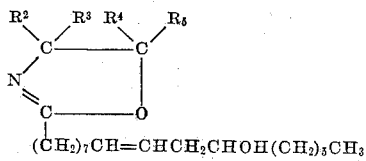

(CH$_2$)$_7$CH=CHCH$_2$CHOH(CH$_2$)$_5$CH$_3$

Reaction takes place between the oxazoline and the anhydride groups in the heteropolymer.

It is known that in a heteropolymer of maleic anhydride and a copolymerizable monovinylidene compound containing a single vinylidene group there are free acid anhydride groups along the polymeric chain. When, for example, equimolar amounts of styrene and maleic anhydride are copolymerized, the styrene and maleic anhydride portions alternate in the chain of the copolymer. Thus, in this example, which is limited to a heteropolymer of styrene but which is typical of the heteropolymers or copolymers of other monovinylidene compounds and maleic anhydride, the heteropolymer is made up of recurring units, each of which has the following structure:

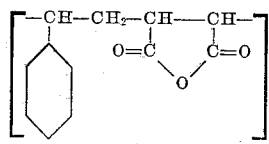

By the process of this invention the oxazoline, which has the skeletal structure:

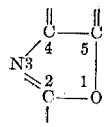

reacts with the anhydride portion of the heteropolymer according to this equation:

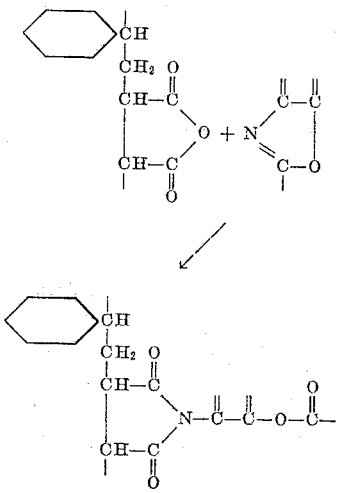

This reaction may be better understood from the following equation which represents the reaction between one unit of a styrene-maleic anhydride heteropolymer and 2(11-hydroxy-8-heptadecenyl) 5-methyloxazoline:

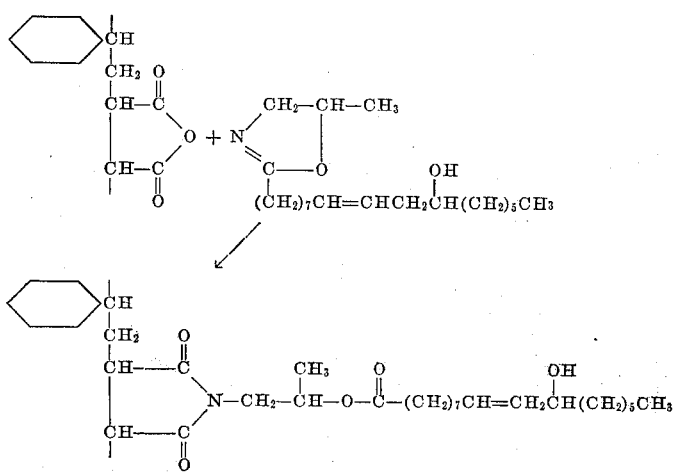

The product in this case is identified as polystyrene - succinimido - isopropyl ricinoleate. This product and others like it are especially unique and differ from those disclosed in my Letters Patent No. 2,543,601 of February 27, 1951, in that they are unsaturated and also contain in each unit an hydroxyl group which is capable of reacting chemically with a wide variety of compounds. Thus, the polymeric imido-esters react with aminoaldehyde resins, such as urea-formaldehyde and melamine - formaldehyde resins, through the hydroxyl groups of the imido-esters and thereby give rise to an entirely new and distinct class of resins which have unusual properties when they are deposited as surface-coating films.

It is also a fact that the hydroxyl groups in the original oxazolines as well as in the imido-esters made therefrom are capable of reacting with free anyhydride groups in the maleic heteropolymer. Thus the oxazoline can be considered as having a functionality of two; that is, of containing two points of reactivity, namely the nitrogen atom in the oxazoline ring and the hydroxyl group in the side-chain. When both of these react, the product is a complex, cross-linked, polymeric imido-ester which is essentially thermoset in the sense that it is insoluble and infusible. The rate of esterification; that is, the rate of reaction of the hydroxyl groups with free anhydride groups is greatly retarded by the presence of solvents during the reaction between the maleic heteropolymer and in this way soluble polymeric imido-esters are prepared. Conversely, the cross-linked product is made in the total absence of solvents or in the presence of very small amounts of the latter.

Since a film of the cross-linked product is hard and thermoset, the product is recommended as a protective surface-coating. For this purpose it is preferred to coat an object to be protected with a film of a solution of the oxazoline and the maleic heteropolymer and then heat the coated object, as for example by baking or under infrared radiation. During the heating operation the solvent evaporates and the oxazoline and maleic heteropolymer react readily and rapidly under the influence of heat to form a film of resistant cross-linked resin on the coated object.

The heterpolymers of maleic anhydride and the monovinylidene compounds are well known and are readily prepared by heating maleic anhydride and one or more monovinylidene compounds, preferably in the presence of a peroxidic catalyst. Their preparation is shown for example in U. S. Patents Nos. 2,047,398 to Voss et al., 2,286,062 to Condo et al., and 2,320,724 to Gerhart et al., to which patents reference is hereby made.

The monovinylidene compounds all contain a single vinylidene group, $>C=CH_2$, and all are capable of polymerizing alone and/or copolymerizing with maleic anhydride to form thermoplastic polymers which are soluble in organic solvents. Typical monovinylidene compounds which copolymerize with maleic anhydride to form heteropolymers, which in turn react by the process of this invention with oxazolines, include the following: Vinyl halides such as vinyl chloride and vinyl bromide; vinyl ethers such as methyl vinyl ether, naphthyl vinyl ether, phenyl vinyl ether, cyclohexyl vinyl ether, isopropyl vinyl ether; vinyl hydrocarbons such as styrene and vinyl naphthalene; heterocyclic compounds such as vinyl pyridine and vinyl carbazole; vinyl esters such as vinyl acetate and vinyl propionate; esters of acrylic and methacrylic acids such as ethyl acrylate, methyl methacrylate, butyl acrylate, octyl methacrylate; acrylonitrile; methacrylonitrile; acrylamide and methacrylamides; acrylic acid and methacrylic acid; methyl vinyl ketone; isopropyl vinyl ketone; allyl esters and methallyl esters of monocarboxylic acids such as allyl stearate and methallyl acetate; and the like. The oxazolines react likewise with the heteropolymers of maleic anhydride and more than one monovinylidene compound as, for example, with a heteropolymer of maleic anhydride, styrene, and acrylonitrile.

The physical properties of the heteropolymers depend on the particular monovinylidene compounds which are copolymerized with the maleic anhydride and on the ratio of the two copolymerizable compounds, but the physical properties of the heteropolymer do not apparently affect the reaction of the heteropolymers with the oxazolines, which is the process of this invention. In all cases however the heteropolymers must be thermoplastic and soluble in an organic solvent such as toluene, xylene, acetone or dioxane. The heteropolymers should also contain from about 5% to about 50% copolymerized maleic anhydride on a molar basis. This assures that the heteropolymers contain sufficient anhydride groups for reactivity with the oxazolines.

The heteropolymers of styrene and maleic at present show the greatest promise particularly in view of their low cost, availability and speedy reaction with oxazolines. Such polymers, ranging from the "tetramer" of average molecular weight around 800 to those of molecular weight at least as high as 30,000, have been reacted with the oxazolines and have given rise to entirely new kinds of resinous imido-esters.

The oxazolines which react with the maleic anhydride heteropolymers are new and have the general formula

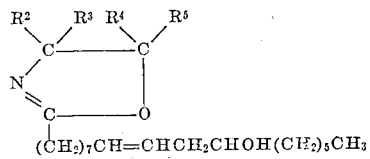

$(CH_2)_7CH=CHCH_2CHOH(CH_2)_5CH_3$ in which the characters $R^2$, $R^3$, $R^4$, and $R^5$ represent hydrogen atoms or monovalent, organic radicals which are free of alcoholic hydroxyl groups or amino-hydrogen atoms, and which preferably are hydrocarbon groups which are free of aliphatic or non-benzenoid unsaturation.

The organic radicals which are represented by R's$^{2\ to\ 5}$ must be unreactive with acid anhydrides. Whether a particular substituent is reactive with acid anhydrides is well within the knowledge of one skilled in chemistry. It is preferred that these radicals be hydrocarbon radicals such as alkyl, acyl, alkaryl, aralkyl, and cycloalkyl groups. The following list includes examples of such suitable hydrocarbon radicals: Methyl, ethyl, iso-propyl, sec.-butyl, tert.-amyl, 2-ethylhexyl, lauryl, n-tetradecyl, and octadecyl groups and the isomers of these groups; phenyl, tolyl, benzyl, p-octylphenyl, m-xylyl, 2,4-di-tert.-amylphenyl, cyclohexyl, and naphthyl groups.

The reaction between the oxazolines and the heteropolymers takes place fairly readily and often exothermally. Reaction takes place even at room temperature (ca. 20° C.) especially when a copolymer and an oxazoline are dissolved in a volatile solvent and are deposited as a thin air-drying film. Heating of the reactants accelerates the rate of reaction and for this reason a minimum temperature of 50° C. is recommended. Temperatures up to 300° C. are operable, although an upper temperature of 250° C. is preferred especially when no solvent—or only a small amount of solvent—is employed. When the resinous product is to be isolated in bulk, the reactants are combined in a reactor and are heated short of gelation. Incipient gelation is an indication that the product is approaching the insoluble and infusible stage. Also, as indicated above, a mixture of reactants can be applied to the surface of an object which it is desired to coat and protect, and the coated object can then be heated. During the heating the reactants combine to form the new polymeric product as a firm coating on the object.

It is evident from the equations above, which are confined for convenience to styrene-maleic copolymers but which are typical of the reaction of the other heteropolymers, that one molecule of oxazoline combines with one anhydride group in the heteropolymer of maleic anhydride and monovinyl compound. The course of the reaction therefore is readily followed by titrating the reaction mixture with standard alkali since the alkali neutralizes the free and unreacted anhydride groups. Such is a conventional method of determining the acid number of resinous materials. In some instances it is desirable to employ less than enough oxazoline to react with all of the anhydride groups, and when such is the case the unreacted anhydride groups can readily be converted to salts, for example, by neutralization, or to esters by reaction with alcohols. Alternatively some of the anhydride groups can be neutralized or esterified first and the remainder then reacted with the oxazoline.

The following examples are presented in order to illustrate—and not to limit—this invention. The reaction of the oxazolines with the heteropolymers of maleic anhydride and monovinylidene compounds is ordinarily substantially complete after two to four hours of heating at about 150° C. to about 200° C. The reaction provides a large class of new resins differing in degree from one another as to the ratio of maleic anhydride to monovinylidene compound and as regards the kind of copolymerized monovinylidene compound and finally as regards the substituents R's[1] to [5] on the oxazoline. All of the oxazolines, however, react in the same way provided they are free of substituent groups which react with acid anhydrides, particularly alcoholic hydroxyl groups and amino-hydrogen atoms; and one oxazoline can be substituted for another in the processes set forth in the following examples.

*Example 1*

A heteropolymer of maleic anhydride and styrene was prepared by heating equimolar amounts of styrene and maleic anhydride in dioxane for 5.5 hours at 60° C. in the presence of two grams of benzoyl peroxide.

Seventy parts of the resultant heteropolymer (40% in dioxane) and 46.8 parts of 2(11-hydroxy-8-heptadecenyl)5-methyloxazoline were mixed and the amount of dioxane was adjusted to provide a 50% solution of the two reactants. These amounts correspond to a ratio of 1:1 for the oxazoline and the anhydride groups in the heteropolymer. Films of the solution were cast, in a thickness of three mils, on glass panels and the panels, after an air-drying period of thirty minutes, were baked for thirty minutes at 150° C. The resultant films were clear, glassy, hard, and abrasion-resistant and at the same time were flexible. They were very resistant to xylene and acetone and had the characteristics of a thermoset resin.

*Examples 2–4*

A 50% solution was prepared in butyl acetate of a mixture of 33.7 parts of 2(11-hydroxy-8-heptadecenyl)5-methyloxazoline and 20.2 parts of a heteropolymer of equimolar amounts of styrene and maleic anhydride. These amounts correspond to a ratio of 1:1 for the oxazoline and the anhydride groups in the heteropolymer. The solution was poured into a three-necked flask equipped with mechanical stirrer, reflux condenser, and thermometer and was heated to refluxing temperature. After three hours of refluxing the solution had changed to an insoluble gelatinous mass.

In a similar way, a mixture of the same oxazoline and a heteropolymer of maleic anhydride and butyl methacrylate (containing maleic anhydride and butyl methacrylate in the molar ratio of 1:4) was converted to an insoluble and infusible mass when heated for three hours at 180° C. The oxazoline and the heteropolymer were present in the ratio of 1:1 for the oxazoline and the anhydride groups in the heteropolymer.

The presence of solvent retards gelation as evidenced by the following: A 50% solution in butyl acetate was made of 2(11-hydroxy-8-heptadecenyl)5-methyloxazoline and the copolymer of maleic anhydride and butyl methacrylate employed above. The reactants were present in amounts corresponding to a ratio of 1:1 for the oxazoline and the anhydride groups in the heteropolymer. The solution was heated and stirred under reflux at 135°–140° C. for 1.5 hours. At this point about 5% more butyl acetate was added and heating was continued for an additional 4.5 hours during which time additions of butyl acetate were made at hourly intervals so that the final concentration of the solution was 32.3%. At the end of a total of six hours of refluxing the entire mass was converted into an insoluble gel.

*Examples 5–10*

As shown above, a heteropolymer of maleic anhydride and a 2(11-hydroxy-8-heptadecenyl)-oxazoline react very readily and, because of the two reactive positions in the oxazoline, they can easily form cross-linked, insoluble polymers. It is, however, possible to prepare soluble, thermoplastic imido-esters by employing those well-known expedients such as lowering of the temperature, diluting the reactants, using excess of one reactant, removal of the product, and so on. In this particular invention completely satisfactory results are obtained and soluble polymeric imido-esters are produced by the following procedure:

A solution of a maleic anhydride heteropolymer is charged to a vessel equipped with agitator, thermometer, reflux condenser, and a gas-inlet tube for the admission of an inert gas such as nitrogen or carbon dioxide used to blanket the reaction mixture and prevent oxidation. Enough solvent is employed so that the final solution is in the range of 25–35% solids. The solvent should preferably have a boiling point of about 120° C. or higher so that the mixture can be refluxed at a temperature from about 125° C. to about 200° C. The oxazoline is added to the solution before heat is applied or during heating. The solution of reactants is then heated to refluxing temperature and is held at this point until the reaction is substantially complete as evidenced by a decrease in the acid number of the reaction mixture. The solution of imido-ester is then cooled and is ready for use, or it can be concentrated if necessary.

This procedure was followed in the preparation of many imido-esters from 2(11-hydroxy-8-heptadecenyl) 5-methyloxazoline and various maleic anhydride heteropolymers. In every case the oxazoline was employed in a molar ratio equal to the moles of maleic anhydride in the heteropolymer. Following is a tabulation of typical examples of the preparation of imido-esters by the described procedure:

| Vinylidene Compound Polymerized with Maleic Anhydride | Mole Ratio of Vinylidene to Maleic Anhydride in Heteropolymer | Solvent for Reaction | Temperature | Time at Reflux | Conc'n of Reac. Mixture | Physical Properties of Product | |
|---|---|---|---|---|---|---|---|
| | | | | | | Viscosity, 25° C. | Acid No. |
| | | | ° C. | Hours | Per Cent | Poises | |
| Butyl Methacrylate | 4:1 | Butyl Acetate | 130 | 4 | 25 | 0.2 | 14.3 |
| Do | 4:1 | Cyclohexanone | 150 | 6 | 25 | 1.0 | 8.2 |
| Methyl Methacrylate | 3.19:1 | Butyl Acetate | 126 | 8 | 25 | 4.9 | 9.8 |
| Methyl Acrylate | 8:1 | do | 124-130 | 8 | 35 | 3.35 | 6.3 |
| Ethyl Methacrylate | 8:1 | do | 128 | 8 | 35 | 8.8 | 9.0 |
| Styrene | 1:1 | do | 128 | 8 | 25 | 0.3 | 12.3 |

All of the above polymeric imido-esters, when freed of solvent, were clear resinous materials. When films of the individual materials were laid down on glass and were baked for an hour at 150° C., they did not become insoluble as did the product of Example 1 above. This failure to convert in this instance to the insoluble condition is due to the fact that the anhydride groups in the heteropolymer have already reacted with the oxazoline in the manner shown in the equation above and none is available for reaction with the hydroxyl groups of the side chain.

The hydroxyl groups, however, in these thermoplastic, resinous imido-esters are free to react with other materials and in this regard they combine—and form very unusual products—with amino resins. Thus, all of the imido-esters made in Examples 5–10 were mixed with various ratios of commercially available urea-formaldehyde and melamine-formaldehyde resins of the organic solvent-soluble type and the resultant mixtures were laid down as films on glass and were baked for thirty minutes at 150° C. In every case the films were clear, pale in color, very hard but flexible, and very resistant to solvent. In these respects they had real advantages over the films of the individual imino-esters or of the individual amino resins alone.

I claim:

1. A process for the preparation of polymeric imido-esters which comprises chemically reacting, at a temperature from 20° C. to 300° C., a thermoplastic heteropolymer of maleic anhydride and a monovinylidene compound with an oxazoline of the general formula

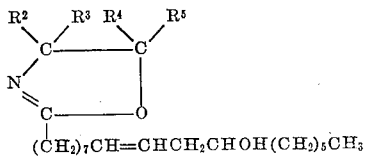

in which $R^2$, $R^3$, $R^4$, and $R^5$ represent members of the class consisting of hydrogen atoms and alkyl, aryl, alkaryl, aralkyl, and cycloalkyl groups.

2. A process for the preparation of polymeric imido-esters which comprises chemically reacting, at a temperature from 20° C. to 300° C., a thermoplastic heteropolymer of maleic anhydride and a monovinylidene compound with an oxazoline of the general formula

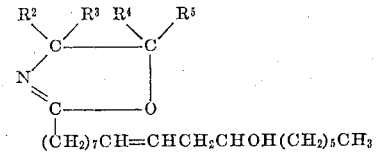

in which $R^2$, $R^3$, $R^4$, and $R^5$ represent members of the class consisting of hydrogen atoms and alkyl, aryl, alkaryl, aralkyl, and cycloalkyl groups, said heteropolymer containing from 5% to about 50% of copolymerized maleic anhydride on a molar basis.

3. A process for the preparation of polymeric imido-esters which comprises chemically reacting, at a temperature from 20° C. to 300° C., a thermoplastic heteropolymer of maleic anhydride and styrene with an oxazoline of the general formula

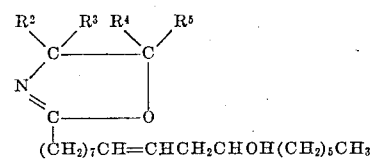

in which $R^2$, $R^3$, $R^4$, and $R^5$ represent members of the class consisting of hydrogen atoms and alkyl, aryl, alkaryl, aralkyl, and cycloalkyl groups.

4. A process for the preparation of a resinous imido-ester which comprises chemically reacting, at a temperature of 50° C. to 250° C., a thermoplastic heteropolymer of maleic anhydride and styrene with 2(11-hydroxy-8-heptadecenyl) 5-methyloxazoline.

5. A process for the preparation of a resinous imido-ester which comprises chemically reacting, at a temperature of 50° C. to 250° C., a thermoplastic heteropolymer of maleic anhydride and butyl methacrylate with 2(11-hydroxy-8-heptadecenyl) 5-methyloxazoline.

6. A process for the preparation of a resinous imido-ester which comprises chemically reacting, at a temperature of 50° C. to 250° C., a thermoplastic heteropolymer of maleic anhydride and methyl methacrylate with 2(11-hydroxy-8-heptadecenyl) 5-methyloxazoline.

7. A process for the preparation of a resinous imido-ester which comprises chemically reacting, at a temperature of 50° C. to 250° C., a thermoplastic heteropolymer of maleic anhydride and ethyl methacrylate with 2(11-hydroxy-8-heptadecenyl) 5-methyloxazoline.

8. A process for the preparation of a resinous imido-ester which comprises chemically reacting, at a temperature of 50° C. to 250° C., a thermoplastic heteropolymer of a maleic anhydride and methyl acrylate with 2(11-hydroxy-8-heptadecenyl) 5-methyloxazoline.

9. A resinous composition of matter as prepared by the process of claim 4.

10. A resinous composition of matter as prepared by the process of claim 5.

11. A resinous composition of matter as prepared by the process of claim 6.

12. A resinous composition of matter as prepared by the process of claim 7.

13. A resinous composition of matter as prepared by the process of claim 8.

14. A resinous composition of matter as prepared by the process of claim 1.

STANLEY P. ROWLAND.

No references cited.